United States Patent
Li et al.

(10) Patent No.: US 11,281,182 B2
(45) Date of Patent: Mar. 22, 2022

(54) REDUNDANT HOT STANDBY CONTROL SYSTEM AND CONTROL DEVICE, REDUNDANT HOT STANDBY METHOD AND COMPUTER-READABLE STORAGE MEDIUM

(71) Applicant: Siemens Aktiengesellschaft, Munich (DE)

(72) Inventors: Dong Li, Beijing (CN); Meng Zhang, Beijing (CN); Tongzhou Wang, Beijing (CN); Yan Wang, Beijing (CN); Chuan Yu Zhang, Beijing (CN)

(73) Assignee: SIEMENS AKTIENGESELLSCHAFT, Munich (DE)

(*) Notice: Subject to any disclaimer, the term of this patent is extended or adjusted under 35 U.S.C. 154(b) by 0 days.

(21) Appl. No.: 17/273,427

(22) PCT Filed: Sep. 5, 2018

(86) PCT No.: PCT/CN2018/104216
§ 371 (c)(1),
(2) Date: Mar. 4, 2021

(87) PCT Pub. No.: WO2020/047780
PCT Pub. Date: Mar. 12, 2020

(65) Prior Publication Data
US 2021/0311453 A1    Oct. 7, 2021

(51) Int. Cl.
*G05B 19/4063*    (2006.01)
*G05B 19/4155*    (2006.01)
(Continued)

(52) U.S. Cl.
CPC ........... *G05B 19/4063* (2013.01); *G05B 9/03* (2013.01); *G05B 19/414* (2013.01);
(Continued)

(58) Field of Classification Search
None
See application file for complete search history.

(56) References Cited

U.S. PATENT DOCUMENTS

| 6,968,242 | B1 | 11/2005 | Hwu et al. |
| 2008/0208361 | A1* | 8/2008 | Grgic ............... G05B 19/41865 700/2 |
| 2008/0209211 | A1 | 8/2008 | Govindaraj et al. |

FOREIGN PATENT DOCUMENTS

| CN | 1879068 A | 12/2006 |
| CN | 1945480 A | 4/2007 |
(Continued)

OTHER PUBLICATIONS

International Preliminary Report on Patentability dated Mar. 18, 2021.
(Continued)

*Primary Examiner* — Qing Yuan Wu
(74) *Attorney, Agent, or Firm* — Harness, Dickey & Pierce, P.L.C.

(57) ABSTRACT

Disclosed is a redundant hot standby control system including K industrial personal computers, with a plurality of virtual control devices being established thereon respectively, at least one of the plurality of virtual control devices being established on each IPC as a main control device; and the other virtual control devices being standby control devices. Each of the standby control devices corresponds to a virtual control device, which serves as the main control device on another IPC, except for the IPC to which the standby control device itself belongs. A procedure, which is the same as that operated on the main control device corresponding thereto, is operated on the standby control device. A control bus of the system is used for connecting a
(Continued)

plurality of the M IPCs; and a field bus is used for connecting the M IPCs and a plurality of field devices.

18 Claims, 2 Drawing Sheets

(51) Int. Cl.
*G06F 9/455* (2018.01)
*G05B 9/03* (2006.01)
*G05B 19/414* (2006.01)
*G06F 11/14* (2006.01)
*G06F 11/20* (2006.01)
*G06F 11/07* (2006.01)
*G06F 13/36* (2006.01)

(52) U.S. Cl.
CPC ......... *G05B 19/4155* (2013.01); *G06F 9/455* (2013.01); *G06F 9/45558* (2013.01); *G06F 13/36* (2013.01); *G05B 2219/14014* (2013.01); *G05B 2219/14104* (2013.01); *G05B 2219/24176* (2013.01); *G05B 2219/24177* (2013.01); *G05B 2219/24178* (2013.01); *G05B 2219/31026* (2013.01); *G06F 11/0766* (2013.01); *G06F 11/1456* (2013.01); *G06F 11/2023* (2013.01); *G06F 11/2028* (2013.01); *G06F 2009/45591* (2013.01)

(56) References Cited

FOREIGN PATENT DOCUMENTS

| | | |
|---|---|---|
| CN | 103281200 A | 9/2013 |
| CN | 103383650 A | 11/2013 |
| CN | 105652851 A | 6/2016 |
| JP | 2003036101 A | 2/2003 |

OTHER PUBLICATIONS

International Search Report and Written Opinion dated Sep. 5, 2018.

* cited by examiner

REDUNDANT HOT STANDBY CONTROL SYSTEM AND CONTROL DEVICE, REDUNDANT HOT STANDBY METHOD AND COMPUTER-READABLE STORAGE MEDIUM

PRIORITY STATEMENT

This application is the national phase under 35 U.S.C. § 371 of PCT International Application No. PCT/CN2018/104216 which has an International filing date of Sep. 5, 2018, which designated the United States of America, the entire contents of which are hereby incorporated herein by reference.

FIELD

Embodiments of the invention generally relate to a redundant hot standby control system, a control device, a redundant hot standby method, and a computer-readable storage medium.

BACKGROUND

Generally, when an industrial control system is operating, in order to improve the reliability of the system, it is necessary to adopt a redundant hot standby solution for the key controllers in the system, so that even in case of an abnormality, the system can still operate without interruptions.

With a traditional redundant hot standby control system, each key controller (also known as a main controller) in the system is usually configured with one or more (for example, P, P being an integer greater than 1) standby controllers serving as standby. When the system is operating properly, a main controller and a standby controller can receive the same input signal at the same time, and process the input signal at the same time; however, under normal circumstances, only a main controller can produce output. When a main controller becomes faulty, since its standby controller is operating at the same time, the standby controller can immediately replace the main controller in producing output, thereby ensuring continuous operation of the system. It is thus clear that this redundant hot standby control system can provide great reliability and excellent convenience for industrial control systems. However, the 1:1 or 1:P set ratio of the main controllers to the standby controllers will also lead to redoubling of system cost.

SUMMARY

An embodiment of the present invention provides a redundant hot standby control system, comprising:

K industrial personal computers (IPC), each having a plurality of virtual control devices created thereon, wherein at least one virtual control device, among the plurality of virtual control devices created on each IPC, is a main control device, remaining virtual control devices among the plurality of virtual control devices created on each IPC being standby control devices, each corresponding to one virtual control device serving as the main control device in an IPC other than its own IPC, and running the same process as thereon as its corresponding main control device does; wherein, K is an integer greater than 1;

a control bus, configured to connect a plurality of the K IPCs; and a field bus, configured to connect the K IPCs and a plurality of field devices.

In an embodiment of the present application, the above-mentioned control bus and field bus may be implemented by a standard bus based on industrial Ethernet technology.

In an embodiment of the present application, the above-mentioned IPC comprises:

IPC hardware;

a plurality of virtual control devices, wherein at least one virtual control device among the plurality of virtual control devices is a main control device, and the virtual control devices other than the virtual control device serving as the main control device among the plurality of virtual control devices each correspond to one virtual control device serving as the main control device in other control devices, and run the same process thereon as its corresponding main control device does;

a general-purpose operating system, configured to provide a configuration management program and an interface for managing the plurality of virtual control devices; and a virtual machine monitor, run on the IPC hardware to allocate hardware resources to the virtual control devices.

In an embodiment of the present application, by the disposition of a virtual machine monitor on the IPC, an intermediate software layer may be created between the hardware of the IPC and an operating system (a general-purpose operating system or a virtual machine), for the purpose of logically dividing the physical hardware of the IPC into a plurality of relatively independent parts that are respectively configured for different operating systems, thereby simulating a plurality of hardware devices with one hardware device.

An embodiment of the present invention further provides a control device. The control device comprises:

hardware;

a plurality of virtual control devices, wherein at least one virtual control device among the plurality of virtual control devices is a main control device, and the virtual control devices other than the virtual control device serving as the main control device among the plurality of virtual control devices each correspond to one virtual control device serving as the main control device in other control devices, and run the same process thereon as its corresponding main control device does;

a general-purpose operating system, configured to provide a configuration management program and an interface for managing the plurality of virtual control devices; and a virtual machine monitor, run on the IPC hardware to allocate hardware resources to the virtual control devices.

An embodiment of the present invention further discloses a redundant hot standby method, applied to an industrial personal computer for running at least one virtual control device, the method comprising:

periodically sending, by using at least one virtual control device among the plurality of virtual control devices as a main control device, a heartbeat signal through a control bus of a control system;

periodically receiving, by using the virtual control devices other than the main control device among the plurality of virtual control devices as standby control devices, the heartbeat signal from its corresponding main control device through the control bus, respectively, wherein the virtual control devices as the standby control devices each correspond to at least one virtual control device serving as the main control device on an IPC other than its own IPC in the control system, and run the same process thereon as its corresponding main control device does; and when one of the virtual control devices as the standby control devices does not receive the heartbeat signal from its corresponding main control device through the control bus within a predetermined time, feeding alarm information back to a central control device of the control system through the control bus.

An embodiment of the present application further provides a computer-readable storage medium, having a computer program stored thereon, wherein when a processor executes the computer program, the above-described redundant hot standby method is implemented.

BRIEF DESCRIPTION OF THE DRAWINGS

Preferred embodiments of the present application will be described in detail below with reference to drawings, so that those of ordinary skill in the art become clearer about the above-described and other characteristics and advantages of the present application. Among the drawings.

The reference numerals used in the figures are as follows:

TABLE 0001

| | |
|---|---|
| 100 | IPC |
| $101_1$-$101_m$ | Main control device |
| $102_1$-$102_n$ | Standby control device |
| 103 | Control bus |
| 104 | Field bus |
| 105 | Field device |
| 106 | Central control device |
| 201 | IPC hardware |
| $202_1$-$202_x$ | Virtual control device |
| 203 | General-purpose operating system |
| 204 | Virtual machine monitor |
| 301-303 | Steps |
| 3011-3013 | Steps |

DETAILED DESCRIPTION OF THE EXAMPLE EMBODIMENTS

Figure 1:
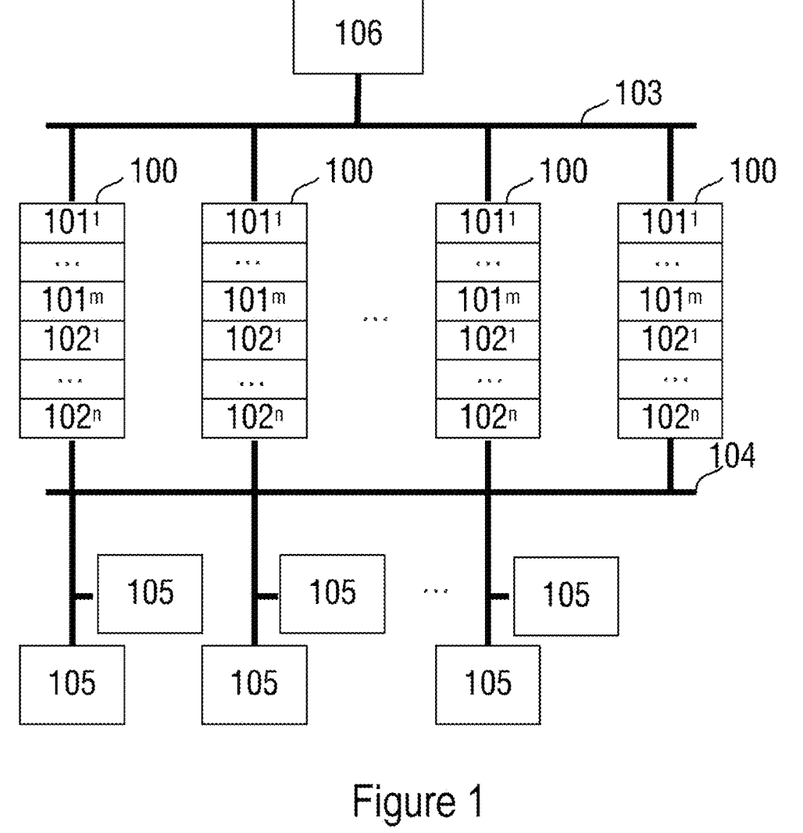
FIG. 1 is a schematic structural diagram for a redundant hot standby control system according to an embodiment of the present application.

In order to improve upon or even solve the above-described problem, an embodiment of the present invention provides a redundant hot standby control system, comprising:

K industrial personal computers (IPC) 100, each having a plurality of virtual control devices $1011$-$101m$, $1021$-$102n$ created thereon, where at least one virtual control device $1011$-$101m$ among the plurality of virtual control devices created on each IPC is a main control device, the remaining virtual control devices $1021$-$102n$ are standby control devices, each corresponding to one virtual control device $1011$-$101m$ serving as the main control device in an IPC other than its own IPC, and running the same process as thereon as its corresponding main control device does; wherein, K is an integer greater than 1;

a control bus 103, configured to connect a plurality of the K IPCs; and a field bus 104, configured to connect the K IPCs and a plurality of field devices 105.

It is clear from the above-described redundant hot standby control system structure that a plurality of virtual control devices are created on one IPC to simulate a plurality of physical controllers, so that the IPC can serve as one or more main control devices; at the same time, the IPC can also serve as a standby control device for a main control device on another IPC in the system; this allows a change from a standby mode in which the ratio of the main controllers to standby controllers in a traditional redundant hot standby solution must be 1:1 or 1: more than 1 to a standby mode of mutual hot standby among a plurality of physical devices, thereby greatly reducing the hardware cost of the control system while ensuring the reliability of the control system.

In an embodiment of the present application, the above-mentioned control bus 103 and field bus 104 may be implemented by a standard bus based on industrial Ethernet technology.

It is thus clear that, in an embodiment of the present application, a plurality of IPCs 100, field devices 105, and central control device 106 in the system are all connected to each other through the control bus 103 and/or the field bus 104; such a bus connection method is simpler. Moreover, the field bus 104 may be implemented with a standard bus based on industrial Ethernet technology, requiring fewer connections compared with the connection method adopted in a traditional redundant hot standby control system in which a main controller and a standby controller need to be connected to their corresponding field devices; this allows further conservation of the hardware resources of the control system and reduction of the hardware cost of the control system.

Figure 2:
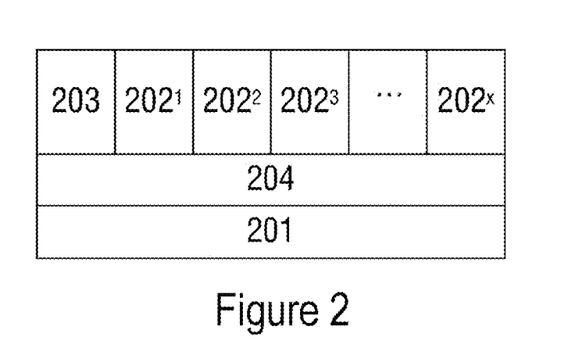
FIG. 2 is a schematic diagram for the internal logical structure of an IPC according to an embodiment of the present application.

In an embodiment of the present application, the above-mentioned IPC comprises:

IPC hardware 201;

a plurality of virtual control devices $2021$-$202x$, wherein at least one virtual control device 2021 among the plurality of virtual control devices $2021$-$202x$ is a main control device, and the virtual control devices $2022$-$202x$ other than the virtual control device serving 2021 as the main control device among the plurality of virtual control devices $2021$-$202x$ each correspond to one virtual control device serving as the main control device in other control devices, and run the same process thereon as its corresponding main control device does;

a general-purpose operating system 203, configured to provide a configuration management program and an interface for managing the plurality of virtual control devices $2021$-$202x$; and a virtual machine monitor 204, run on the IPC hardware 201 to allocate hardware resources to the virtual control devices $2021$-$202x$.

In an embodiment of the present application, by the disposition of a virtual machine monitor 204 on the IPC, an intermediate software layer may be created between the hardware of the IPC and an operating system (a general-purpose operating system or a virtual machine), for the purpose of logically dividing the physical hardware of the IPC into a plurality of relatively independent parts that are respectively configured for different operating systems, thereby simulating a plurality of hardware devices with one hardware device.

Application of the virtual machine monitor 204 to the creation and management of virtual control devices allows more effective implementation of a soft standby solution in which one physical device simulates a plurality of physical standby controllers.

In an embodiment of the present application, the above-mentioned processor is a multi-core processor having M cores, wherein M is an integer greater than 1; the general-purpose operating system 203 is run on one core of the multi-core processor; and the remaining M−1 cores respectively run M−1 virtual machines and create M−1 virtual control devices.

In the above-described solution, each virtual control device runs independently on a separate core of a multi-core controller of an IPC. This ensures that each virtual control device runs independently in parallel, without the need for process queuing in the processor; thus, the response speed of a virtual control device is guaranteed, processing delay is greatly reduced, and the reliability of the control system is further ensured.

By the above-described method, the number of IPCs in a standby control device pool 102 may be clearly determined at the beginning of the configuration of a control system, and the hardware resources required by the control system may be quickly determined, which provides convenience of implementation.

An embodiment of the present invention further provides a control device. The control device comprises:

hardware 201;

a plurality of virtual control devices 2021-202x, wherein at least one virtual control device 2021 among the plurality of virtual control devices 2021-202x is a main control device, and the virtual control devices 2022-202x other than the virtual control device serving 2021 as the main control device among the plurality of virtual control devices 202-202x each correspond to one virtual control device serving as the main control device in other control devices, and run the same process thereon as its corresponding main control device does; a general-purpose operating system 203, configured to provide a configuration management program and an interface for managing the plurality of virtual control devices 2021-202x; and a virtual machine monitor 204, run on the IPC hardware 201 to allocate hardware resources to the virtual control devices 2021-202x.

In an embodiment of the present application, by the disposition of a virtual machine monitor 204 on the control device, an intermediate software layer may be created between the hardware of the control device and an operating system (a general-purpose operating system or a virtual machine), for the purpose of logically dividing the physical hardware of the control device into a plurality of relatively independent parts that are respectively configured for different operating systems, thereby simulating a plurality of hardware devices with one hardware device.

Application of the virtual machine monitor 204 to the creation and management of virtual control devices allows more effective implementation of a soft standby solution in which one physical device simulates a plurality of physical standby controllers.

The above-mentioned processor is a multi-core processor having M cores, wherein M is an integer greater than 1; the general-purpose operating system 203 is run on one core of the multi-core processor; and the remaining M−1 cores respectively run M−1 virtual machines and create M−1 virtual control devices.

In the above-described solution, each virtual control device runs independently on a separate core of a multi-core controller of an IPC. This ensures that each virtual control device runs independently in parallel, without the need for process queuing in the processor; thus, the response speed of a virtual control device is guaranteed, processing delay is greatly reduced, and the reliability of the control system is further ensured.

An embodiment of the present invention further discloses a redundant hot standby method, applied to an industrial personal computer for running at least one virtual control device, the method comprising:

periodically sending, by using at least one virtual control device among the plurality of virtual control devices as a main control device, a heartbeat signal through a control bus of a control system;

periodically receiving, by using the virtual control devices other than the main control device among the plurality of virtual control devices as standby control devices, the heartbeat signal from its corresponding main control device through the control bus, respectively, wherein the virtual control devices as the standby control devices each correspond to at least one virtual control device serving as the main control device on an IPC other than its own IPC in the control system, and run the same process thereon as its corresponding main control device does; and when one of the virtual control devices as the standby control devices does not receive the heartbeat signal from its corresponding main control device through the control bus within a predetermined time, feeding alarm information back to a central control device of the control system through the control bus.

With the above-described method, a plurality of virtual control devices are disposed on an industrial personal computer (IPC), wherein at least one of the virtual control device serves as a main control device and the remaining virtual control devices as standby control devices for the main control devices disposed on another IPC, so that cross-standby between IPCs in the system is realized while the reliability of the control system is ensured; thus, in terms of the number of physical devices, the number of IPCs may be smaller than or equal to the number of main control devices in the system. This allows a great reduction in the hardware cost of the control system.

In an embodiment of the present application, running a plurality of virtual control devices comprises: running a virtual machine monitor on hardware of the industrial personal computer; running a general-purpose operating system on the virtual machine monitor, wherein the general-purpose operating system provides a configuration management program and a configuration management interface; running a plurality of virtual machines on the virtual machine monitor through the configuration management interface as the plurality of virtual control devices.

Thus, by the disposition of a virtual machine monitor on the IPC, an intermediate software layer may be created between the physical hardware of the IPC and an operating system (a general-purpose operating system or a virtual machine), for the purpose of logically dividing the physical hardware of the IPC into a plurality of relatively independent parts that are respectively configured for different operating systems, thereby simulating a plurality of hardware devices with one hardware device.

Moreover, running a virtual machine monitor on an industrial personal computer to create and manage virtual control devices allows more effective implementation of a soft standby solution in which one physical device simulates a plurality of physical standby controllers.

Further, in an embodiment of the present application, when a processor of an industrial personal computer is a multi-core processor having a plurality of cores, the plurality of virtual machines created may be in one-to-one correspondence with the plurality of cores of the multi-core processor respectively. Thus, each virtual control device created may independently run on a separate core of the multi-core controller. This ensures that each virtual control device runs independently in parallel, without the need for process queuing in the processor; thus, the response speed of a virtual control device is guaranteed, processing delay is greatly reduced, and the reliability of the control system is guaranteed.

An embodiment of the present application further provides a computer-readable storage medium, having a computer program stored thereon, wherein when a processor executes the computer program, the above-described redundant hot standby method is implemented.

In order to describe more clearly the objectives, technical solutions, and advantages of the present invention, the technical solutions in embodiments of the present invention will be explained clearly and completely below with reference to the drawings for embodiments of the present invention. Obviously, the described embodiments are only some, but not all, embodiments of the present invention. Any embodiments obtained by those of ordinary skill in the art based on the described embodiments of the present invention without making inventive efforts fall into the protection scope of the present invention.

The terms "comprising", "provided with", and any variants thereof in the description and claims of the present invention are intended to cover nonexclusive inclusion. For example, a process, method, system, product, or device comprising a series of steps or units is not necessarily limited to explicitly listed steps or units, and instead may include other steps or units that are not explicitly listed or are intrinsic to these processes, methods, systems, products, or devices.

As described above, with a traditional redundant hot standby control system, one or P standby controllers are configured for each key main controller in the system, for example, a programmable logic controller (PLC) in the system, to establish a 1:1 or 1:P correspondence between the main control controllers and the standby controllers, so that when a main controller becomes faulty, a standby controller corresponding to the faulty main controller will immediately take over and continue the operation, thereby ensuring continuous operation of the system. For example, assuming that N key processes exist in a control system, it is usually necessary to dispose N PLCs in the system to run the N key processes respectively. Moreover, if the control system adopts the traditional redundant hot standby technology and each key process requires P standbys, then N×P PLCs need to be additionally disposed as the standby PLCs of the N PLCs. In other words, a total of N×(P+1) PLCs are required in the control system to ensure proper operation of the control system. It is thus clear that if the traditional redundant hot standby technology is adopted, the number of controllers required for the control system will be redoubled, and consequently the hardware cost of the system will be redoubled.

To solve this problem, an embodiment of the present application provides a redundant hot standby control system that allows a great reduction in the hardware cost of the control system while ensuring the reliability of the control system.

FIG. 1 shows a schematic structural diagram for a redundant hot standby control system according to an embodiment of the present application. As shown in FIG. 1, the redundant hot standby control system comprises: K industrial personal computers (IPC) 100, a control bus 103, a field bus 104, and a plurality of field devices 105, wherein, K is an integer greater than 1.

A plurality of virtual control devices 1011-101$m$, 1021-102$n$ are respectively created on the K IPCs 100, wherein at least one virtual control device 1011-101$m$ among the plurality of virtual control devices 1011-101$m$, 1021-102$n$ is a main control device, running a process of the control system respectively; the remaining virtual control devices 1021-102$n$ are standby control devices, each corresponding to one virtual control device 1011-101$m$ serving as the main control device in an IPC other than its own IPC, and running the same process thereon as its corresponding main control device does.

Since each IPC is provided with a plurality of virtual control devices in an embodiment of the present application, a standby mode in which a plurality of IPCs in a control system serve as standby control devices for one another may be implemented, so that the total number of IPCs contained in the system may be smaller than or equal to the number of processes that need to be run in the control system. In other words, in terms of the number of physical devices, system reliability may be ensured without adding any hardware devices for hot standby.

In addition, the control bus 103 is configured to connect the plurality of IPCs 100 to establish communication between one or more virtual control devices 1011-101$m$ as a main control device on a certain IPC 100 and a plurality of virtual control devices 1021-102$n$ as the corresponding standby control device on another IPC 100. The above-mentioned virtual control device may be a soft PLC or a virtual PLC.

In an embodiment of the present application, the control bus 103 may be configured to complete fault detection of at least one main control device 1011-101$m$ and a plurality of standby control devices 1021-102$n$ running on a plurality of IPCs 100.

The control bus 103 is further configured to connect the plurality of IPCs 100 and the one or more central control devices 106. The one or more central control devices 106 may, through the control bus 103, obtain operating status information about one or more virtual control devices 1011-101$m$ as a main control device and a plurality of virtual control devices 1021-102$n$ as standby control devices on the plurality of IPCs 100, thereby allowing configuration, monitoring, and management of the plurality of virtual control devices 1011-101$m$, 1021-102$n$. The central control device 106, usually located in a central control room, provides a configuration and management man-machine interaction interface for the entire control system. Generally, the central control device 106 may also be referred to as an upper computer. The central control device 106 may be implemented by one or more computers. Certainly, in order to achieve remote control, the central control device 106 may also be implemented through the cloud.

Specifically, in an embodiment of the present application, in a normal operating state, the virtual control devices 1011-101$m$ that serve as main control devices on each IPC 100 can periodically send, through the control bus 103, a heartbeat signal to their corresponding one or more virtual control devices serving as standby control devices. Each virtual control device serving as a standby control device determines whether its corresponding main control device is in a proper operating state according to the received heartbeat signal of the corresponding main control device. In computer science, a heartbeat signal is a periodic signal, generated by computer hardware or software, used for indicating that the computer system is in a proper operating state or for synchronization. In an embodiment of the present application, the heartbeat signal may be specifically realized by a pulse signal. In addition, to allow the heartbeat signal to carry more information, for example, identification information about a main control device, the heartbeat signal may also be realized by an encoded pulse signal; in other words, the heartbeat signal may be encoded and decoded to carry identification information about a main control device. In an embodiment of the present application, if a virtual control device serving as a standby control device does not receive the heartbeat signal from its corresponding virtual control device serving as a main control device through the control bus 103 within a predetermined time, then it may be determined that the corresponding main control device has failed; in this case, the virtual control device can replace its corresponding main control device in controlling the field bus 104 for output.

In an embodiment of the present application, the redundant hot standby control system may further comprise one or more central control devices 106. The central control device 106 is connected to the plurality of IPCs 100 through the control bus 103. When a virtual control device serving as a standby control device on a certain IPC 100 determines that its corresponding main control device has become faulty, it can report failure information about the main control device to the one or more central control devices 106 through the control bus 103, thereby ensuring the continuity of the control system operation and realizing fault monitoring and alarm triggering of the control system.

In an embodiment of the present application, the bus 103 may be implemented by a standard bus based on industrial Ethernet technology. For example, the control bus 103 may be implemented by a bus that complies with the PROFINET bus standard introduced by the PROFIBUS International (PI) or a bus that complies with the Ethernet control automation technology (EtherCAT) bus standard.

The field bus 104 is configured to connect the plurality of IPCs 100 and the plurality of field devices 105 to establish communication between the virtual control devices 1011-101m serving as main control devices as well as the virtual control devices 1021-102n serving as standby control devices on each IPC 100 and the plurality of field devices 105.

In an embodiment of the present application, the field bus 104 completes synchronization of input and output of a main control device and its corresponding standby control device to a field device 105, allowing one of the main control device and its corresponding virtual control device to control its corresponding field device 105. Generally, the field device 105 may also be referred to as an I/O device, and so synchronization through a field bus may also be referred to as IC synchronization.

Generally, operation on the field bus 104 may be divided into two parts: reading data from each field device 105 and writing data to each field device 105, wherein reading data from a field device 105 usually requires no synchronization, while writing data to a field device 105 requires synchronization. Commonly used synchronization methods for writing data include: (1) a third-party arbitration method; when this method is used, both a main control device and a standby control device can send a write signal, and, instead of being directly connected to a field device 105, are connected to a bus arbitration device; the bus arbitration device decides whose signal is to be forwarded to a field device 105; (2) in a proper operating state, a standby control device, without sending any write signals, autonomously listens for any heartbeat signal from a main control device; when no heartbeat signal from the main control device has been detected, the standby control device judges that the main control device has become faulty, and sends a write signal to a field device 105.

Similar to the implementation of the control bus 103, in an embodiment of the present application, the field bus 104 may also be implemented by a standard bus based on industrial Ethernet technology. For example, the field bus 104 may be implemented by a bus that complies with the PROFINET bus standard or a bus that complies with the EtherCAT bus standard.

The control bus 103 and the field bus 104 ensure the failure detection of a main control device and the corresponding standby control device, so that one of the main control device and its corresponding virtual control device can control its corresponding field device 105 and ensure the continuity of control system operation.

The one or more central control devices 106 can, through the control bus 103, obtain status information, for example, main/standby status Information and device failure information, about one or more main control devices 1011-101m and a plurality of standby control devices 1021-102n in the plurality of IPCs 100. The one or more central control devices 106 may further provide an administrator of the control system with an interface for configuring, monitoring and managing the IPC 100, so that an administrator of the control system can configure, monitor, and manage the plurality of IPCs 100 through this interface.

From the structure of the redundant hot standby control system shown in FIG. 1, it is clear that by the creation of a plurality of virtual control devices on an IPC to simulate a plurality of physical controllers, on the one hand, one IPC can simulate one or more main control devices and, on the other hand, can also simulate a plurality of standby control device as standby control devices of a main control device on another IPC; this allows a change from a standby mode in which the ratio of the main controllers to standby controllers in a traditional redundant hot standby solution must be 1:1 or 1:P to a standby mode in which one physical device may also serve as hot standby for a plurality of physical devices while serving as a main control device, that is, a change to a mode of cross-standby between a plurality of physical devices. For example, still assuming that N key processes exist in a control system and only one virtual control device among the X virtual control devices created on each IPC in the control system serves as a main control device, then N IPCs need to be disposed in the system and one virtual control device created on each IPC to run these N key processes respectively. In this case, among these N IPCs, X−1 virtual control devices created on each IPC may respectively serve as standby control devices for the main control devices created by the other N−1 IPCs, and X−1 standbys may be configured for each main control device. It is clear that in an embodiment of the present application, the control system needs only N IPCs in total to achieve 1:(X−1) standby of N key processes. Further, if a plurality of virtual control devices among the X virtual control devices created on each IPC in the control system serve as main control devices, then the number of IPCs required by the control system may even be smaller than the number of key processes that the control system needs to run. In actual applications, the number of IPCs in a control system may be determined according to the number of processes that the control system needs to run, the number of virtual control devices that may be created on each IPC, and the cost and safety requirements of the control system. Those of ordinary skill in the art can understand that this redundant hot standby control solution based on soft standby control devices allows a great reduction in the hardware cost of the control system while ensuring the reliability of the control system.

Generally, one or more main control devices (virtual control devices) simulated by one physical control device (IPC) may also be referred to as soft main control devices, and a plurality of standby control devices simulated (virtual control devices) are referred to as soft standby control devices.

Further, in the redundant hot standby control system proposed in an embodiment of this application, the IPC 100, the field device 105, and the central control device 106 are all connected to each other through the control bus 103 and/or the field bus 104; therefore, this bus-type connection is simpler.

Moreover, as described above, the field bus 104 may be implemented with a standard bus based on industrial Ethernet technology, requiring fewer connections compared with the connection method adopted in a traditional redundant hot standby control system in which a main controller and a standby controller need to be connected to their corresponding field devices; this allows further conservation of the hardware resources of the control system and reduction of the hardware cost of the control system.

The internal logic structure of an IPC 100 in the redundant hot standby control system according to an embodiment of the present application will be described in detail below with reference to the accompanying drawings.

FIG. 2 shows the internal logical structure of an IPC 100 as described in an embodiment of the present application. As shown in FIG. 2, in an embodiment of the present application, an IPC 100 may comprise: IPC hardware 201, a plurality of virtual control devices 2021-202$x$, a general-purpose operating system (GPOS) 203, and a virtual machine monitor 204, wherein x is an integer greater than 1.

The IPC hardware 201 may comprise a processor, a memory, a disk, and an input/output (I/O) interface.

As described above, at least one of the plurality of virtual control devices 2021-202$x$ serves as a main control device, on which a process of the control system runs; the virtual control devices other than the main control device among the plurality of virtual control devices 2021-202$x$ each correspond to one virtual control device serving as the main control device in an IPC other than its own IPC in the control system, and run the same process thereon as its corresponding main control device does.

Specifically, in an embodiment of the present application, the virtual control devices 2021-202$x$ may be implemented in the form of a virtual machine. The virtual machine may run on the virtual machine monitor 204, and is configured and managed by the general-purpose operating system (GPOS) 203.

The GPOS 203 is a general-purpose operating system that provides a configuration management program and an interface for managing all the virtual control devices 2021-202$x$. An administrator of the control system may configure and manage all the virtual control devices 2021-202$x$ through the interface provided by the GPOS 203. In addition, the GPOS 203 can also monitor and control the main/standby status of the virtual control devices 2021-202$x$. For example, when the GPOS 203 detects a main control device failure through the control bus 103, the main/standby status of the corresponding virtual control device may be changed from "Standby" to "Main", and the main status of the virtual control device may further be reported to the central control device 106 through the control bus 103. Thus, the GPOS 203 can ensure that, for one process, only one control device in a control system can control a field device 105 in the control system.

In an embodiment of the present application, by the disposition of a virtual machine monitor 204 on the IPC, an intermediate software layer may be created between the physical hardware of the IPC and an operating system (a general-purpose operating system or a virtual machine), for the purpose of logically dividing the physical hardware of the IPC into a plurality of relatively independent parts that are respectively configured for different operating systems, thereby simulating a plurality of hardware devices with one hardware device.

Those of ordinary skill in the art can understand that a hypervisor is an intermediate software layer that runs between physical hardware and an operating system, and may be used as a virtual machine monitor allowing a plurality of operating systems and applications to share hardware. A hypervisor is generally used on a server, capable of accessing all the physical hardware devices, including a disk and a memory, on the server. When the server starts and executes the hypervisor, it loads the operating systems of all the virtual machine clients while allocating appropriate amounts of memory, processor, network resources, and disk hardware resources to each virtual machine.

Based on the preceding information, in an embodiment of the present application, hypervisor technology may be applied; a hypervisor may be run on an IPC to create and manage a plurality of virtual machines that implement the plurality of virtual control devices respectively. Specifically, a hypervisor runs directly on the IPC hardware 201, controls the IPC hardware 201, and allocates an appropriate amount of hardware resources to the virtual control devices 2021-202$x$. It is thus clear that running a hypervisor on an IPC to create and manage virtual control devices allows more effective implementation of a soft standby solution in which one physical device simulates a plurality of physical standby controllers.

Although a plurality of virtual control devices may be created on one IPC to realize a cross-standby mode in which a plurality of physical devices serve as main control devices while serving as standby control devices that provide hot standbys for a plurality of other main control devices, thereby allowing a reduction in the system cost, the problem of processing delay in a virtual control device caused by limitations of CPU resources of an IPC may occur, resulting in untimely switching between the main/standby controllers, which reduces the reliability of the system. Therefore, in an embodiment of the present application, in order to ensure that when a main control device becomes faulty, its standby virtual control device quickly takes over as the main control device, allowing a reduction in the processing delay of the virtual control device; a multi-core processor may be used to achieve this objective.

A method for creating a plurality of virtual control devices 2021-202$x$ on an IPC as described in an embodiment of the present application will be described in detail below. Specifically, in an embodiment of the present application, the processor of each IPC is a multi-core processor. For example, if the IPC uses an Intel Core i7 as its processor, the processor will have 4 cores; if the IPC uses an Intel Core i9 as its processor, the processor will have 10 cores. Assume that the multi-core processor has M computing engines (cores), wherein M is a natural number greater than 1. Then, in an embodiment of the present application, the GPOS 203 may be run on one core of the multi-core processor, and M−1 virtual machines may be run on the remaining M−1 computing engines. Wherein, at least one of the M−1 virtual machines serves as at least one main control device 1011-101m of the control system, running a process of the control system respectively; the remaining plurality of virtual machines serve as standby control devices 1021-102n of the control system, and run the same process thereon as its corresponding main control device does. The GPOS 203 provides an interface for configuring and managing the M−1 virtual control devices; an administrator can complete configuration and management of all the virtual control devices 1011-101m, 1021-102n through the interface provided by the GPOS 203, for example, mapping each of the control devices 1011-101m, 1021-102n with the M−1 cores of the multi-core processor.

From the above-described method of creating a plurality of virtual control devices 1011-101m, 1021-102n on an IPC, it is clear that the number of virtual control devices created on an IPC is related to the number of cores of its multi-core processor. Thus, it may be determined that in an embodiment of the present application, the number of IPCs included in the control system is related to the number of processes running in the control system, the number of cores of the multi-core processor of the IPC, and the cost and safety requirements of the control system. Specifically, the number of IPCs included in the control system may be calculated according to the number of key processes running in the control system, the number of cores of the multi-core processor of the IPC, and the set ratio of the main control devices to the standby control devices in the control system. For example, in an embodiment of this application, it is assumed that N key processes exist in the control system, the multi-core processor of an IPC has M cores, and the control system requires that the set ratio of the main control devices to the standby control devices be 1:P. Then, in an embodiment of the present application, the control system will comprise N main control devices and N×P standby control devices. The multi-core processor of an IPC has M cores; in other words, an IPC can simulate M−1 control devices; therefore, the control system will comprise CEIL ((N+N× P)/(M−1)) IPCs, wherein CEIL( ) indicates the round-up function; in other words, its return value is greater than or equal to the smallest integer of the specified expression in parentheses. For example, when N=3, M=4, P=2, that is, when 3 key processes exist in the control system, the multi-core processor of an IPC serving as a standby control device pool has 4 computing engines (cores), and it is required that the set ratio of the main control devices to the standby control devices be 1:2, only 3 IPCs are needed in a redundant hot standby control system described in this application, wherein three virtual control devices are created on each IPC, of which one serves as a main control device and the other two serve as standby control devices for backing up the main control devices on the other two IPCs. In contrast, a traditional redundant hot standby system requires a total of 6 controller devices (3 main controller devices and standby controller devices). By the above-described calculation method, the number of IPCs in the control system may be clearly determined at the beginning of the configuration of the control system, and the hardware resources required by the control system may be quickly determined, which provides convenience of implementation.

It is thus clear that the use of a method of this application allows great reductions in the number of control devices in the control system and in the hardware cost of the control system; especially, when the number of key processes in the control system is large, such a redundant hot standby system based on soft control devices allows a significant reduction in system hardware costs.

Moreover, in the above-described solution, each virtual control device runs independently on a separate core of a multi-core controller of the IPC; this ensures that each virtual control device runs independently in parallel, without the need for process queuing in the processor; thus, the response speed of a virtual control device is guaranteed, processing delay is greatly reduced, and the reliability of the control system is guaranteed.

Certainly, it should be noted that the present embodiment is only an example of the present invention; the present invention is not limited to the creation of only one virtual control device (virtual machine) on a processor core; certainly, it may also be possible to, based on the real-time performance requirements of the control system, choose to create one or more virtual control devices on a processor core, thereby further reducing the number of IPCs required by the control system or reducing the numbers of processor cores required of an IPC, in order to achieve the objective of further reducing the hardware cost of the control system.

Corresponding to the above-described redundant hot standby control system, an embodiment of the present application further discloses a control device, which may serve as a standby control device of the control system. The internal logical structure of the control device, as shown in FIG. 2, may comprise: hardware 201, a plurality of virtual control devices 2021-202x, a general-purpose operating system (GPOS) 203, and a virtual machine monitor 204. The specific function, structure, and implementation of each component are as described above, and will not be detailed again herein.

In an embodiment of the present application, by the disposition of a virtual machine monitor 204 on the standby control device, an intermediate software layer may be created between the hardware of the IPC and an operating system (a general-purpose operating system or a virtual machine), for the purpose of logically dividing the physical hardware of the IPC into a plurality of relatively independent parts that are respectively configured for different operating systems, thereby simulating a plurality of hardware devices with one hardware device.

In an embodiment of the present application, the virtual machine monitor 204 may be a hypervisor. Applying hypervisor technology as the virtual machine monitor 204 to create and manage virtual control devices allows more effective implementation of a soft standby solution in which one physical device simulates a plurality of physical standby controllers.

In an embodiment of the present application, a processor in the IPC hardware may be a multi-core processor having M cores, wherein M is an integer greater than 1; the general-purpose operating system 203 is run on one core of the multi-core processor; and the remaining M−1 cores respectively run M−1 virtual machines and create M−1 virtual control devices. In the above-described solution, each virtual control device runs independently on a separate core of a multi-core controller of an IPC. This ensures that each virtual control device runs independently in parallel, without the need for process queuing in the processor; thus, the response speed of a virtual control device is guaranteed, processing delay is greatly reduced, and the reliability of the control system is further ensured.

Figure 3:
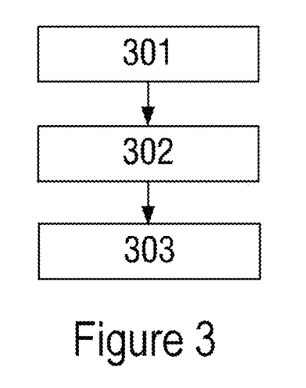
FIG. 3 is a flowchart for a redundant hot standby method according to an embodiment of the application.

Corresponding to the standby control device, an embodiment of the present application further discloses a redundant hot standby method, applied to an industrial personal computer (IPC) for running a plurality of virtual control devices. FIG. 3 shows a flowchart for a redundant hot standby method according to an embodiment of the present application. As shown in FIG. 3, the method comprises:

Step 301: Periodically sending, by using at least one virtual control device among the plurality of virtual control devices as a main control device, a heartbeat signal through a control bus of a control system.

Step 302: Periodically receiving, by using the virtual control devices other than the main control device among the plurality of virtual control devices as standby control devices, the heartbeat signal from its corresponding main control device through the control bus, respectively, wherein the virtual control devices as the standby control devices each correspond to at least one virtual control device serving as the main control device on an IPC other than its own IPC in the control system, and run the same process thereon as its corresponding main control device does.

Step 303: When one of the virtual control devices as the standby control devices does not receive the heartbeat signal from its corresponding main control device through the control bus within a predetermined time, feeding alarm information back to a central control device of the control system through the control bus.

In this step, after one of the virtual control devices as the standby control devices receives a main/standby status switching indication from the central control device through the control bus, it modifies its own main/standby status by changing its own main/standby status from "Standby" to "Main", and further outputs an own output signal to a corresponding field device in the control system through a field bus of the control system.

In another embodiment of the present application, if the control system adopts a third-party arbitration method to realize the synchronization of written data in control devices, in which both a main control device and a standby control device in the control system can send a write signal, and, instead of being directly connected to a field device 105, are connected to a bus arbitration device, then the central control device will instruct the bus arbitration device to perform write signal switching and decide whose signal is to be forwarded to the field device 105.

In another embodiment of the present application, a bus arbitration device in the control system can directly receive write signals sent by all the main control devices and the standby control devices, and can directly select write signals based on the conditions of the received write signals; in other words, it can determine whose signal is to be forwarded to the field device 105, without the need for receiving write signal switching control from the central control device. In this case, in each of the IPCs, the virtual control device serving as a main control device does not need to periodically send a heartbeat signal, and the virtual control device serving as a standby control device does not need to periodically detect a heartbeat signal from its corresponding main control device, nor does it need to, when it receives no heartbeat signal from its corresponding main control device within a predetermined time, feed alarm information back to a central control device of the control system through the control bus. In other words, in this case, each virtual control device on each IPC needs to run only a process configured thereon, and output the running result to the bus arbitration device.

With the above-described method, by the disposition of a plurality of virtual control devices on an industrial personal computer, it may be ensured that the number of IPCs in the control system is smaller than or equal to the number of processes running in the control system. This allows a great reduction in the hardware cost of the control system.

Figure 4:
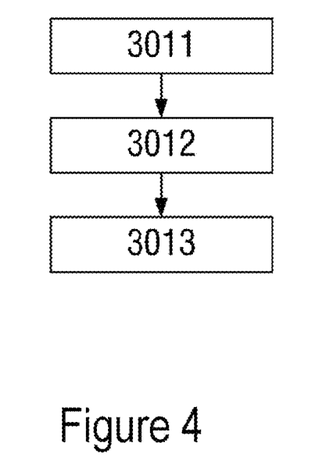
FIG. 4 is a flowchart for a specific method for creating x virtual control devices on an IPC according to an embodiment of the present application.

In an embodiment of the present application, at least one virtual control device is run as a standby control device on the industrial personal computer, and its specific implementation method may be as shown in FIG. 4, which specifically comprises the following steps:

Step 3011: Running a virtual machine monitor on hardware of the industrial personal computer;

Step 3012: Running a general-purpose operating system on the virtual machine monitor, wherein the general-purpose operating system provides a configuration management interface;

Step 3013: Running, through the configuration management interface, at least one virtual machine on the virtual machine monitor as the at least one virtual control device.

In an embodiment of the present application, by the disposition of a virtual machine monitor on the IPC, an intermediate software layer may be created between the physical hardware of the IPC and an operating system (a general-purpose operating system or a virtual machine), for the purpose of logically dividing the physical hardware of the IPC into a plurality of relatively independent parts that are respectively configured for different operating systems, thereby simulating a plurality of hardware devices with one hardware device.

Specifically, in an embodiment of the present application, the virtual machine monitor may adopt hypervisor technology; in other words, a hypervisor is directly run on the IPC hardware 201 to control the IPC hardware in allocating an appropriate amount of hardware resources to each virtual machine. It is thus clear that by running a hypervisor on an industrial personal computer to create and manage virtual control devices, a soft standby solution in which one physical device simulates a plurality of physical standby controllers may be implemented more effectively.

Further, in an embodiment of the present application, when the processor of the industrial personal computer is a multi-core processor, the x virtual machines created in Step 3013 may be in one-to-one correspondence with the x cores of the multi-core processor respectively. Thus, each virtual control device created may independently run on a separate core of the multi-core controller. This ensures that each virtual control device runs independently in parallel, without the need for process queuing in the processor; thus, the response speed of a virtual control device is guaranteed, processing delay is greatly reduced, and the reliability of the control system is guaranteed.

Certainly, it should be noted that the present embodiment is only an example of the present invention; the present invention is not limited to the creation of only one virtual control device (virtual machine) on a processor core; certainly, it may also be possible to, based on the real-time performance requirements of the control system, choose to create one or more virtual control devices on a processor core, thereby further reducing the number of IPCs required by the control system or reducing the numbers of processor cores required of an IPC, in order to achieve the objective of further reducing the hardware cost of the control system.

An embodiment of the present application further provides a computer-readable storage medium, having a computer program stored thereon, wherein when a processor executes the computer program, the above-described redundant hot standby method is implemented.

It should be understood that although the specification describes the embodiments separately, an embodiment does not contain only one independent technical solution, and that such a method of description is only for the sake of clarity; those of ordinary skill in the art should treat the specification as a whole, and the technical solutions provided in the embodiments can be appropriately combined into other embodiments that those of ordinary skill in the art understand.

The detailed descriptions given above are only specific descriptions of feasible embodiments of the present invention. They are not intended to limit the scope of protection of the present invention, and any equivalent implementation modes or alterations, such as a combination, division, or repetition of features, made without departing from the technical spirit of the present invention should fall into the protection scope of the present invention.

What is claimed is:

1. A redundant hot standby control system, comprising:
K industrial personal computers (IPC), each of the K IPCs including a plurality of virtual control devices respectively created on each respective IPC of the K IPCs, at least one virtual control device, among the plurality of virtual control devices created on each respective IPC, being a main control device and remaining virtual control devices, among the plurality of virtual control devices created on each respective IPC, being standby control devices, each of the remaining virtual control devices corresponding to one virtual control device serving as a main control device in an IPC other than its own IPC, and running a same process as the corresponding one virtual control device serving as the main control device in the IPC other than its own IPC, K being an integer greater than 1;
a control bus, configured to connect the K IPCs; and
a field bus, configured to connect the K IPCs and a plurality of field devices.

2. The redundant hot standby control system of claim 1, wherein the control bus and the field bus are implemented by a standard bus based on an industrial Ethernet technology.

3. The redundant hot standby control system of claim 2, wherein each respective IPC comprises: IPC hardware, a general-purpose operating system, and a virtual machine monitor, and wherein
the general-purpose operating system is configured to provide a configuration management program and an interface for managing the plurality of virtual control devices; and
the virtual machine monitor is run on the IPC hardware to allocate hardware resources to the virtual control device.

4. The redundant hot standby control system of claim 3, wherein
a processor is a multi-core processor having M cores, M being an integer greater than 1;
the general-purpose operating system is run on one core of the multi-core processor; and
the remaining M−1 cores respectively run M−1 virtual machines and create M−1 virtual control devices.

5. The redundant hot standby control system of claim 4, wherein the number K of the IPCs is determined according to a number of processes run in the control system, the number M of the cores of the processor, and a set ratio of the main control devices to the standby control devices in the control system.

6. The redundant hot standby control system of claim 1, wherein each respective IPC comprises: IPC hardware, a general-purpose operating system, and a virtual machine monitor, and wherein
the general-purpose operating system is configured to provide a configuration management program and an interface for managing the plurality of virtual control devices; and
the virtual machine monitor is run on the IPC hardware to allocate hardware resources to the plurality of virtual control devices.

7. The redundant hot standby control system of claim 6, wherein
a processor is a multi-core processor having M cores, M being an integer greater than 1;
the general-purpose operating system is run on one core of the multi-core processor; and
the remaining M−1 cores respectively run M−1 virtual machines and create M−1 virtual control devices.

8. The redundant hot standby control system of claim 7, wherein the number K of the IPCs is determined according to a number of processes run in the control system, the number M of the cores of the processor, and a set ratio of the main control devices to the standby control devices in the control system.

9. A control device, comprising:
hardware;
a plurality of virtual control devices, at least one virtual control device among the plurality of virtual control devices being a main control device, and respective virtual control devices other than the at least one virtual control device serving as the main control device, each respectively corresponding to one virtual control device serving as a main control device in other control devices, and being configured to run a same process as the respectively corresponding one virtual control device serving as the main control device in the other control devices other than its own control device;
a general-purpose operating system, configured to provide a configuration management program and an interface for managing the plurality of virtual control devices; and
a virtual machine monitor, configured to run on the IPC hardware to allocate hardware resources to the plurality of virtual control devices.

10. The control device of claim 9, wherein
a processor is a multi-core processor having M cores, wherein M is an integer greater than 1;
the general-purpose operating system being configured to run on one core of the multi-core processor; and
the remaining M−1 cores of the M cores respectively being configured to run M−1 virtual machines and create M−1 virtual control devices.

11. A redundant hot standby method, applicable to an industrial personal computer for running a plurality of virtual control devices, the method comprising:
periodically sending, via at least one virtual control device among the plurality of virtual control devices acting as a main control device, a heartbeat signal through a control bus of a control system;
periodically receiving, via the virtual control devices among the plurality of virtual control devices as standby control devices, other than the at least one virtual control device acting as the main control device, the heartbeat signal from a corresponding main control device through the control bus, respectively, wherein the virtual control devices acting as the standby control devices each respectively correspond to at least one virtual control device serving as the main control device on an IPC other than its own IPC in the control system, and being configured to run a same process as the respectively corresponding at least one virtual control device serving as the main control device in the IPC other than its own IPC; and feeding, upon a respective one of the virtual control devices acting as the standby control devices not receiving the heartbeat signal from its corresponding main control device through the control bus within a time frame, alarm information back to a central control device of the control system through the control bus.

12. The method of claim 11, further comprising:

modifying, after one of the virtual control devices, acting as the standby control devices, receives a main/standby status switching indication from the central control device through the control bus, an own main/standby status, and outputting an own output signal to a corresponding field device in the control system through a field bus of the control system.

13. A non-transitory computer-readable storage medium, storing a computer program which, when executed by a processor, configures the processor to implement the redundant hot standby method of claim 12.

14. The method of claim 11, wherein running a plurality of virtual control devices comprises:

running a virtual machine monitor on hardware of the industrial personal computer;

running a general-purpose operating system on the virtual machine monitor, the general-purpose operating system providing a configuration management program and a configuration management interface; and running a plurality of virtual machines on the virtual machine monitor through the configuration management interface as the plurality of virtual control devices.

15. The method of claim 14, wherein a processor of the IPC is a multi-core processor including a plurality of cores, and wherein the plurality of virtual machines are in one-to-one correspondence with the plurality of cores of the multi-core processor, respectively.

16. A non-transitory computer-readable storage medium, storing a computer program which, when executed by a processor, configures the processor to implement the redundant hot standby method of claim 15.

17. A non-transitory computer-readable storage medium, storing a computer program which, when executed by a processor, configures the processor to implement the redundant hot standby method of claim 14.

18. A non-transitory computer-readable storage medium, storing a computer program which, when executed by a processor, configures the processor to implement the redundant hot standby method of claim 11.

* * * * *